(12) United States Patent
Gomes et al.

(10) Patent No.: US 7,806,647 B2
(45) Date of Patent: Oct. 5, 2010

(54) LIFT GATE APPARATUS FOR A TRUCK OR TRAILER BODY

(75) Inventors: Celio J. Gomes, York Beach, ME (US); David F. Rivers, Wallingford, CT (US)

(73) Assignee: Patriot Lift Co., LLC, Kingshill, St. Croix ( * ) Notice: Subject to any disclaimer, the term of this patent is extended or adjusted under 35 U.S.C. 154(b) by 366 days.

(21) Appl. No.: 11/816,861

(22) PCT Filed: Mar. 10, 2006

(86) PCT No.: PCT/US2006/008474

§ 371 (c)(1), (2), (4) Date: Aug. 22, 2007

(87) PCT Pub. No.: WO2006/104663

PCT Pub. Date: Oct. 5, 2006

(65) Prior Publication Data

US 2008/0159839 A1   Jul. 3, 2008

Related U.S. Application Data

(60) Provisional application No. 60/664,846, filed on Mar. 24, 2005.

(51) Int. Cl.
*B60P 1/44* (2006.01)
(52) U.S. Cl. .................................................. 414/545
(58) Field of Classification Search ............... 414/545, 414/556
See application file for complete search history.

(56) References Cited

U.S. PATENT DOCUMENTS

| | | | | |
|---|---|---|---|---|
| 2,236,317 A | * | 3/1941 | Howland | 414/545 |
| 2,391,813 A | * | 12/1945 | Wood | 414/557 |
| 3,185,322 A | * | 5/1965 | Matthews | 414/545 |
| 3,877,590 A | * | 4/1975 | Brown | 414/545 |
| 3,887,092 A | * | 6/1975 | Leet | 414/545 |
| 4,007,844 A | * | 2/1977 | Perkins | 414/471 |
| 4,563,121 A | * | 1/1986 | Drews | 414/545 |
| 5,100,282 A | * | 3/1992 | Maier et al. | 414/545 |

(Continued)

FOREIGN PATENT DOCUMENTS

DE    2645025    4/1978

(Continued)

*Primary Examiner*—Charles A Fox
(74) *Attorney, Agent, or Firm*—O'Shea Getz P.C.

(57) ABSTRACT

A lift gate apparatus for a truck or trailer body is provided that includes a platform and a drive mechanism operable to pivot the platform between a stowed position and a deployed position, and vertically move the platform from a bed-level position and a lower than bed-level position. In some embodiments, the drive mechanism utilizes a pneumatic motor to power one or both of a pivot drive and a lift drive. In some embodiments, the drive mechanism utilizes one or more pneumatic cylinders within the pivot drive or lift drive. In some embodiments, one or more pneumatic cylinders are arranged to both pivot the platform and vertically lift the platform, thereby combining the functionality of the pivot drive and the lift drive. The emergency brake system of the truck or trailer body can be used as a source of compressed air to power the pneumatic motor and/or cylinders.

4 Claims, 8 Drawing Sheets

U.S. PATENT DOCUMENTS

| | | | | |
|---|---|---|---|---|
| 5,176,226 | A | * | 1/1993 | Martin et al. ............... 187/242 |
| 5,299,829 | A | | 4/1994 | Rivers, Jr. et al. |
| 5,439,342 | A | | 8/1995 | Hall et al. |
| 5,597,282 | A | * | 1/1997 | Hoffman et al. ............ 414/545 |
| 5,641,262 | A | | 6/1997 | Dunlop et al. |
| 5,911,437 | A | * | 6/1999 | Lawrence ................ 280/766.1 |
| 5,992,824 | A | * | 11/1999 | Voss .......................... 254/2 B |
| 6,025,685 | A | | 2/2000 | Parsadayan |
| 6,092,336 | A | | 7/2000 | Wright et al. |
| 6,142,551 | A | | 11/2000 | Ciavaglia et al. |
| 6,464,283 | B2 | * | 10/2002 | Haddad, Jr. .................. 296/98 |
| 7,491,026 | B2 | * | 2/2009 | Hooker ....................... 414/545 |
| 2007/0048116 | A1 | * | 3/2007 | Friedrich .................... 414/545 |
| 2007/0065262 | A1 | * | 3/2007 | Murphy ...................... 414/462 |

FOREIGN PATENT DOCUMENTS

| | | |
|---|---|---|
| DE | 3028893 | 3/1982 |
| EP | 0849114 | 6/1998 |
| GB | 2045699 | 11/1980 |

* cited by examiner

LIFT GATE APPARATUS FOR A TRUCK OR TRAILER BODY

Applicant hereby claims priority benefits under 35 U.S.C. 119(e) of U.S. Provisional Patent Application No. 60/664,846 filed Mar. 24, 2005 and PCT Patent Application No. PCT/US06/008474 filed Mar. 10, 2006, the disclosures of which are herein incorporated by reference.

BACKGROUND OF THE INVENTION

1. Field of the Invention

The present invention relates to lift gates for truck and trailer bodies, and more particularly to power assisted lift gates for truck and trailer bodies.

2. Description of the Prior Art

Lift gates provide a mechanism for transporting loads on and off of truck and trailer bodies. In many instances, the lift gate is typically positioned at the rear or side of the truck or trailer body. Most lift gates are hydraulically operated by a system that requires the truck to be running, or they operate off of a battery. Disadvantages of a hydraulically actuated lift gate include: 1) substantial system weight; 2) extensive required maintenance; and 3) the possibility of environmental contamination as a result of hydraulic fluid leaks.

What is needed is a lift gate apparatus that overcomes these disadvantages.

SUMMARY OF THE INVENTION

According to the present invention, a lift gate apparatus for a truck or trailer body is provided that includes a platform and a drive mechanism operable to pivot the platform between a stowed position and a deployed position, and vertically move the platform from a bed-level position and a lower than bed-level position. In some embodiments, the drive mechanism utilizes a pneumatic motor to power one or both of a pivot drive and a lift drive. In some embodiments, the drive mechanism utilizes one or more pneumatic cylinders within the pivot drive or lift drive. In some embodiments, one or more pneumatic cylinders are arranged to both pivot the platform and vertically lift the platform, thereby combining the functionality of the pivot drive and the lift drive. The emergency brake system of the truck or trailer body can be used as a source of compressed air to power the pneumatic motor and/or cylinders.

An advantage of the present lift gate apparatus is that it does not use hydraulic fluid. As a result, there is no chance of a hydraulic fluid spill, or the need to handle and/or dispose of hydraulic fluid.

Another advantage of the present lift gate apparatus is that a lightweight lift gate apparatus is provided. A person of skill in the art will recognize the advantage of providing a lightweight system that enables the vehicle to accommodate additional loads.

The present lift gate apparatus advantageously utilizes an efficient pneumatic system that can accommodate considerable loads. The gearbox used in some embodiments provides considerable mechanical advantage that enables a relatively small and efficient pneumatic motor to accommodate a considerable load. In addition, the present apparatus does not require a significant air supply.

These and other objects, features and advantages of the present invention will become apparent in light of the drawings and detailed description of the present invention provided below.

DETAILED DESCRIPTION OF THE INVENTION

Figure 1:
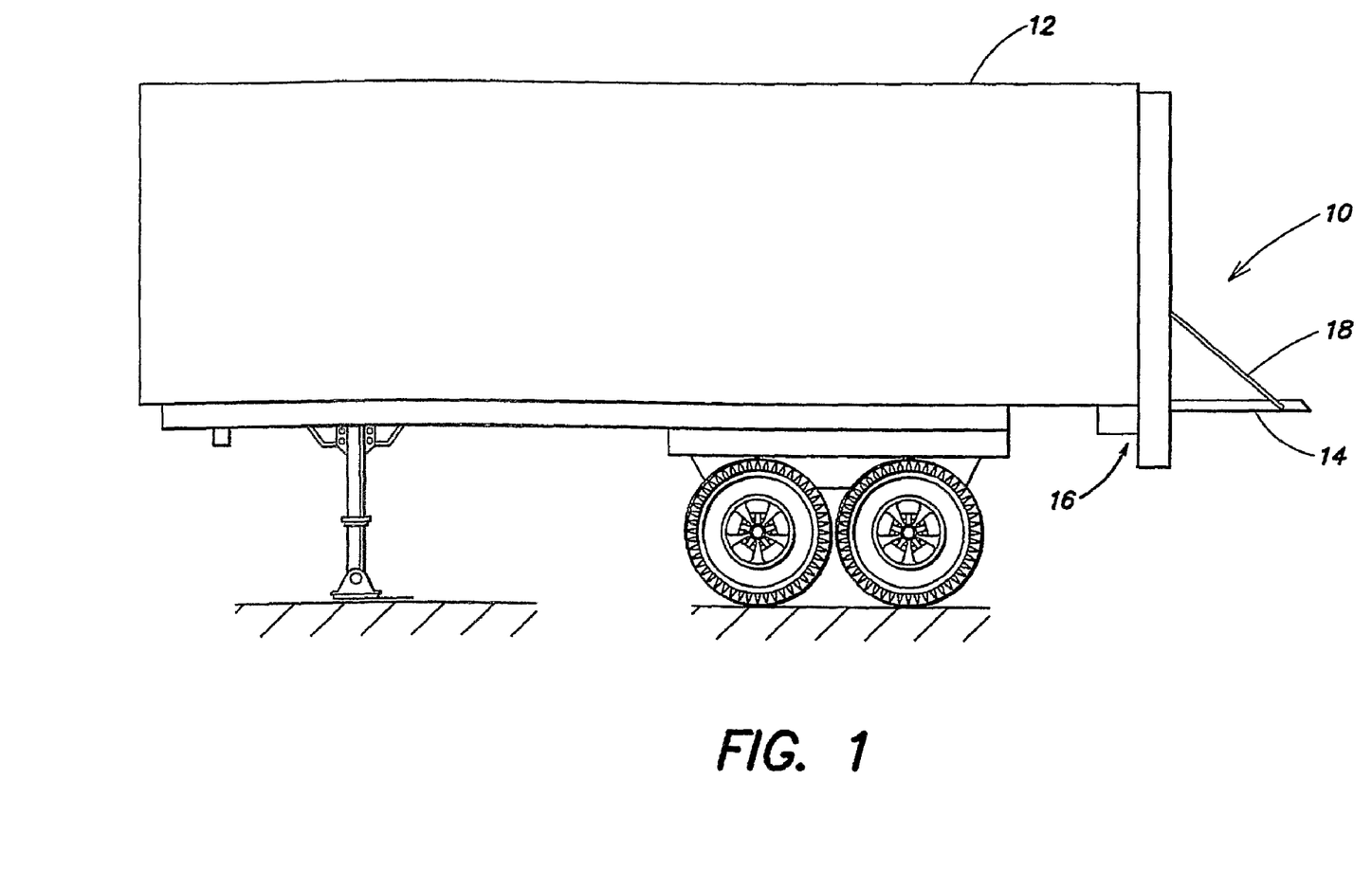
FIG. 1 is a diagrammatic side view of a trailer disengaged from a tractor and having a lift gate apparatus.

Referring to FIGS. 1-10, a lift gate apparatus 10 for a truck or trailer body 12 is provided. For illustration purposes, FIG. 1 shows the present lift gate apparatus 10 mounted on a trailer body 12. The present lift gate apparatus 10 is not, however, limited to trailer applications and can be used with a variety of truck and trailer applications (e.g., rear entry van and trailer bodies, stake side truck and trailer bodies, side entry stake bodies, etc.). For ease of explanation, the aforesaid truck and trailer applications will be described hereinafter collectively as a "truck" application. The lift gate apparatus 10 includes a platform 14 and a drive mechanism 16.

Figure 2:
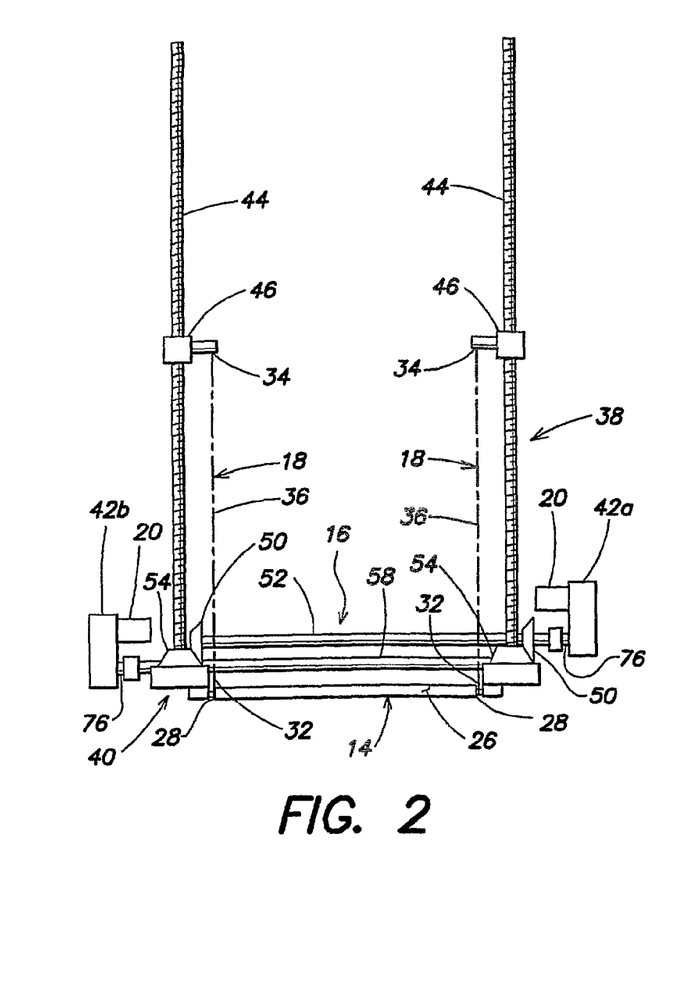
FIG. 2 is a diagrammatic view of an embodiment of the drive mechanism, links and platform.
Figure 3:
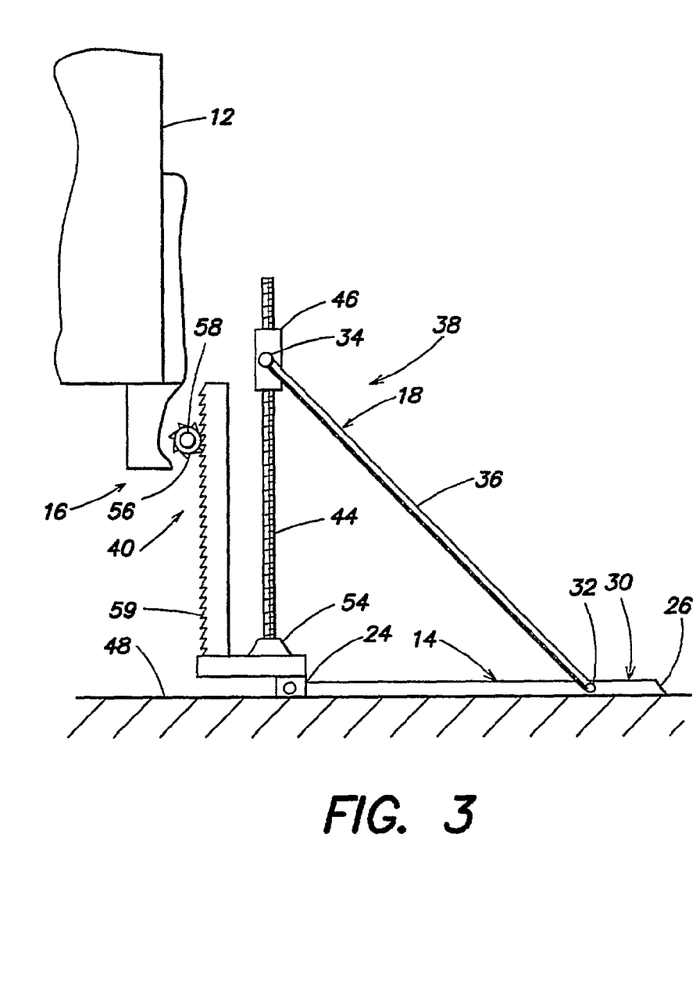
FIG. 3 is a diagrammatic side partial view of a lift gate apparatus, illustrating the platform in a lowered, deployed position.

Referring to FIGS. 2 and 3, the platform 14 includes a panel 30 that extends between an inner edge 24, an outer edge 26, and a pair of side edges 28. The side edges 28 extend between the inner and outer edges 24, 26. The panel 30 can be a single or a multi-piece structure. The characteristics of the panel 30 can vary to suit the application (e.g., a solid panel or a grate). The platform 14 is configured to pivot relative to the truck body 12 between a stowed position to a deployed position. In the stowed position, the outer edge 26 of the platform 14 is proximate the truck body 12 (e.g., see the phantom line figure in FIG. 6). In the deployed position, the platform 14 is substantially horizontally disposed with the inner edge 24 adjacent the truck body 12, and the outer edge 26 disposed outwardly from the truck body 12 (e.g., see FIG. 3 or FIG. 9).

The drive mechanism 16 includes a pivot drive 38 and a lift drive 40. The pivot drive 38 is operable to pivot the platform 14 between the stowed and deployed positions. The lift drive 40 is operable to move the platform 14 between a bed-level position and a lower position (e.g., move the platform 14 between the truck bed 12 and the ground 48).

Figure 5:
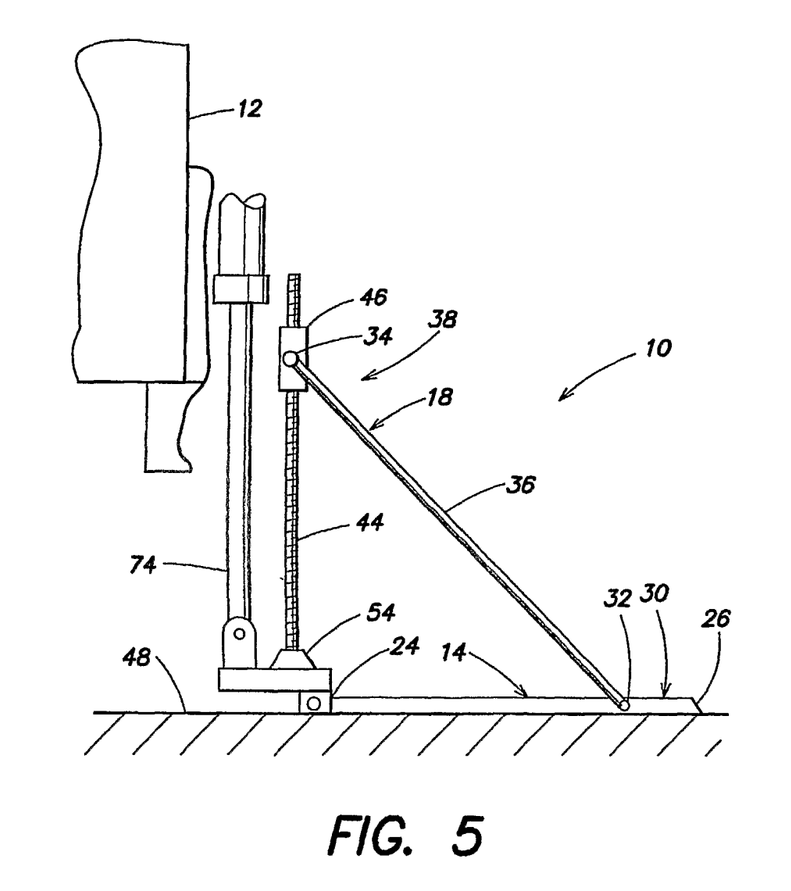
FIG. 5 is a diagrammatic side partial view of a lift gate apparatus, illustrating one or more pneumatic cylinders utilized within the lift drive portion of the drive mechanism.

Referring to FIGS. 2, 3 and 5, the drive mechanism 16 can assume a variety of different arrangements. For example in a first embodiment, the pivot drive 38 portion of the drive mechanism 16 can include at least one threaded rod 44 and a threaded sleeve 46. The rod 44 is threadably engaged with a sleeve 46, and rotation of the rod 44 causes the sleeve 46 to travel axially along the rod 44. In other embodiments (not shown), the pivot drive 38 can include a chain and sprocket arrangement, or a cable and sprocket arrangement. A link 18 is attached to and extends between the pivot drive 38 and the platform 14. The link 18 includes a platform end 32, a drive end 34, and a middle segment 36. The middle segment 36 may be rigid or flexible. The platform end 32 is pivotally attached to the platform 14. In the embodiment that includes a threaded sleeve 46, the drive end 34 is pivotally connected to the sleeve 46. In the embodiments that include a cable or chain with a sprocket, the drive end of the link is attached to the cable or chain.

Figure 6:
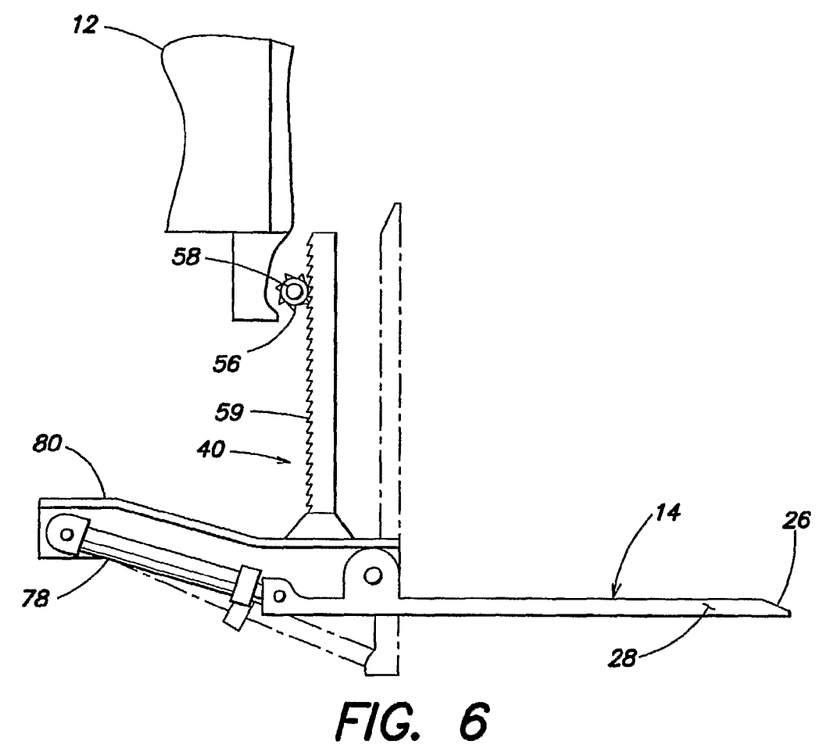
FIG. 6 is a diagrammatic side partial view of an embodiment of the present lift gate apparatus.

Referring to FIGS. 3 and 6, the lift drive 40 can also assume a variety of different arrangements. In a first embodiment, the lift drive 40 includes at least one threaded rod 44 and at least one threaded sleeve 46. Each rod 44 is threadably engaged with a sleeve 46, and rotation of the rod 44 causes the sleeve 46 to travel axially along the rod 44. In the case of a spur and rack gear arrangement, the rotation of the spur gear 56 causes the linear rack gear 59 to move relative to the spur gear 56. In another embodiment, the lift drive 40 includes a chain and sprocket arrangement (not shown), or a cable and pulley arrangement (not shown). The platform 14 is attached to the chain or cable. Driving the sprocket (or pulley) causes the chain (or cable) and attached platform 14 to travel.

In the above described embodiments, the pivot drive 38 and lift drive 40 are connected to the at least one gearbox 42. In a first embodiment shown in FIG. 2, the pivot drive 38 is connected to a first gearbox 42*a* and the lift drive 40 is connected to a second gearbox 42*b*. In each instance, a variety of mechanical arrangements can be used to connect the pivot and lift drives 38, 40 to the gearboxes 42*a*, 42*b*. For example, in the embodiment wherein the lift drive 40 and pivot drive 38 each include a threaded rod 44 and sleeve 46 combination, a pair of first bevel gears 50 are attached to a pivot cross shaft 52, which shaft 52 is disposed adjacent the pivot point of the platform 14. A second bevel gear 54 is attached to each threaded rod 44 and engaged with the respective first bevel gear 50 attached to the pivot cross shaft 52. The drive end 34 of each link 18 is attached to each sleeve 46, and the sleeves 46 are vertically aligned with one another. With respect to the lift drive 40, a pair of spur gears 56 (see FIGS. 3 and 6) are attached to a lift cross shaft 58. A linear rack gear 59 is connected to the platform 14 and engaged with the respective spur gear 56 attached to the lift cross shaft 58. The lift cross shaft 58 is coupled to a gearbox 42*b*.

In the embodiment wherein the pivot drive 38 includes a chain and sprocket arrangement, a pair of drive sprockets are attached to a pivot cross shaft, which shaft is disposed adjacent the pivot point of the platform 14. An undriven sprocket is disposed on each side of the platform 14, spaced apart from, but aligned with the driven sprocket disposed on the same side of the platform 14. A chain loop extends around and is engaged with each driven and undriven sprocket pair. The drive end of each link 18 is vertically aligned with and attached to the chain loop on that side of the platform. The pivot cross shaft 52 is connected to a pivot gearbox 42*a*. A similar arrangement can be used for the lift drive 40 (e.g., a lift cross shaft 58, a pair of driven sprockets attached to the lift cross shaft 58, a pair of undriven sprockets spaced apart from, but aligned with the driven sprockets, and a pair of chain loops extending between and engaged with each driven and undriven sprocket pair). The lift cross shaft 58 is connected to a lift gearbox 42*b*.

In each of these examples above, the pivot cross shaft 52 and lift cross shaft 58 are described as being engaged with independent gearboxes 42. In an alternative embodiment, each cross shaft 52, 58 is engaged with a single gearbox 42. In this embodiment, the gearbox 42 is configured so that each cross shaft 52, 58 may be driven independently.

Referring to FIG. 2, in the above described embodiments, a motor 20 is provided that includes an output shaft coupled to the respective gearbox 42. Operation of motor 20 causes rotation of the motor output shaft, which in turn causes rotation of the shafts and gears of the gearbox 42. The motor 20 may be electrical or pneumatic. However, the motor 20 is preferably a pneumatic gear motor that is powered by an external air source. An example of an acceptable commercially available pneumatic gear motor is a WADCO pneumatic gear motor model no. 33MA-220S1 produced by WADCO, a division of Ingersoll-Rand. Preferably, motor 20 is a vane-type rotary driven motor having a gear reduction assembly with an 80-100 to 1 gear reduction ratio.

Figure 4:
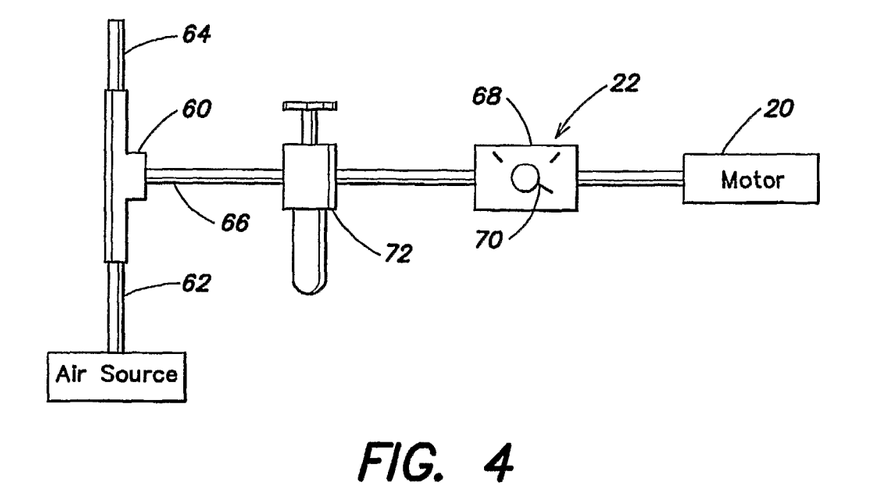
FIG. 4 is a diagrammatic side view of an embodiment of the present lift gate apparatus.

A variety of air sources can be used for the preferred pneumatic motor 20. For example, a compressed air storage cylinder can be attached to the truck body 12, or a local source of compressed air can be used. Preferably, the air source is portable with the truck body 12 so that it is readily available to operate the lift gate apparatus 10. In a preferred embodiment, the compressed air source is the existing air supply from the emergency brake assembly of the vehicle. Referring to FIG. 4, a tee connector 60 is provided on the emergency brake line to provide an airflow from the brake line to the motor 20. The tee connector 60 has an input line 62 connected to the air source, a first output line 64 connected to the emergency brake system of the truck, and a second output line 66 connected to the motor 20. A controller 22 is provided between the tee connector 60 and the motor 20 to control the flow of compressed air to the motor 20.

The controller 22 is configured to selectively control operation of the motor 20. In the preferred embodiment wherein the motor 20 is pneumatically operated, the controller 22 includes a valve 68. The valve 68 acts as an air shutoff valve that controls the direction and amount of air the pneumatic motor 20 receives. In some embodiments, the valve 68 will only provide an airflow to pneumatic motor 20 if the valve 68 is manually opened and retained in the open position (e.g., by manually moving a spring-biased lever 70 as shown in FIG. 4). That is, air will be directed to the pneumatic motor 20 if the operator moves and holds lever 70. Once lever 70 is returned to an "off" position, the air supply to the pneumatic motor 20 will be shut off. If lever 70 is released, the valve 68 will automatically shut off. This prevents the valve 68 from being left in a position where air source is connected only to the pneumatic motor 20.

The valve 68 is also preferably a three-position valve that includes a "neutral" position, a first supply position ("down"), and a second supply position ("up"). As noted above, the valve 68 is biased to the "neutral" position. The lever 70 enables the operator to move the valve 68 between the "neutral" position and either of the first or second supply positions. The valve 68 is connected to the pneumatic motor 20 such that air passing through the valve 68 when in the first supply position causes the pneumatic motor 20 to rotate in a first direction (e.g., clockwise) associated with a first lift gate motion. Likewise, the valve 68 is connected to the pneumatic motor 20 such that air passing through the valve 68 when it's in the second supply position causes the pneumatic motor 20 to rotate in a second direction (e.g., counterclockwise) associated with a second lift gate motion, opposite the first motion. The valve 68 may employ one or more air escape ports that utilize mufflers to allow unneeded or excess air to escape.

In alternative embodiments, the valve 68 can be a power-assisted type control valve that utilizes one or more solenoids, for example to actuate the valve 68 to the first or second positions. Such a power-assisted valve 68 may be configured so that the user operates the valve 68 in proximity of the valve 68 or at a position remote from the valve 68 (e.g., from the cab of the truck). Even with such alternative valve designs, however, the valve 68 is preferably biased towards the "neutral" position. Pneumatic control valves are known in the art and the operation thereof need not be discussed further herein.

In some embodiments, a lubrication unit 72 (e.g., an automatic oil mist lubricator) is provided upstream of the pneumatic motor 20, and more preferably upstream of both the motor 20 and the valve 68. The lubricator 72 treats the air with a fine oil mist so that the valve and the motor 20 are lubricated and so that they can operate efficiently. Automatic lubrication units are known in the art and will not, therefore, be further described herein.

Referring to FIG. 2, each gearbox 42 typically includes an input shaft and an output shaft 76. In some embodiments, the gearbox 42 also includes a manual input shaft. In some embodiments, the gearbox 42 may include a pair of output shafts 76 (see example above wherein a pivot cross shaft 52 and a lift cross shaft 58 are connected to a gearbox 42). A gear arrangement is disposed between the input shaft(s) and the output shaft(s) 76. The gear arrangement provides mechanical advantage to the input shaft(s), thereby enabling the motor 20 to drive a larger load than would be possible otherwise. The configuration of the gear arrangement can be varied to suit the application at hand. Examples of acceptable gear arrangements are disclosed in U.S. Patent Application No. 60/466,004 filed Apr. 28, 2003 and PCT Patent Application Serial No. PCT/US2004/012904 entitled "Tractor-Trailer Landing Gear Apparatus" filed Apr. 27, 2004, both of which are incorporated herein by reference and are owned by the assignee of the present application.

To operate the present lift gate apparatus 10 in a manual mode, an operator can operate a hand crank attachable to the manual input shaft of a gearbox to operate the lift gate apparatus 10.

To operate the present lift gate apparatus 10 in a power-assist operation mode, the operator moves control valve 68 into a supply position designated "DOWN" for lowering or pivoting the platform 14 downwardly, or a position designated "UP" for raising or pivoting the platform 14 upwardly. In the "DOWN" or "UP" position, the compressed air powers the pneumatic motor 20, which in turn actuates the drive mechanism 16. Using the drive mechanism 16 examples given above, when it is desired to pivot the platform 14, the pneumatic motor 20 and respective gearbox 42 actuates the pivot drive 38 to rotate the pivot cross shaft 52, which in turn causes the drive end 34 of the links 18 to move vertically up or down. As a result, the platform 14 pivots between the stowed and deployed positions. When it is desired to vertically lower or raise the platform 14, the pneumatic motor 20 and respective gearbox 42 actuate the lift drive 40 to rotate the lift cross shaft 58, which in turn causes the platform 14 to move upwardly or downwardly.

Alternative embodiments of the drive mechanism 16 utilize one or more pneumatic cylinders alone or in combination with the above-described pneumatic motor and gearbox arrangements to pivot the platform 14 between the stowed and deployed positions and/or vertically move the platform 14 between the vehicle bed-level and a position vertically lower than the bed-level (e.g., the ground 48). The air sources described above may be used to power the pneumatic cylinder(s).

Figure 11:
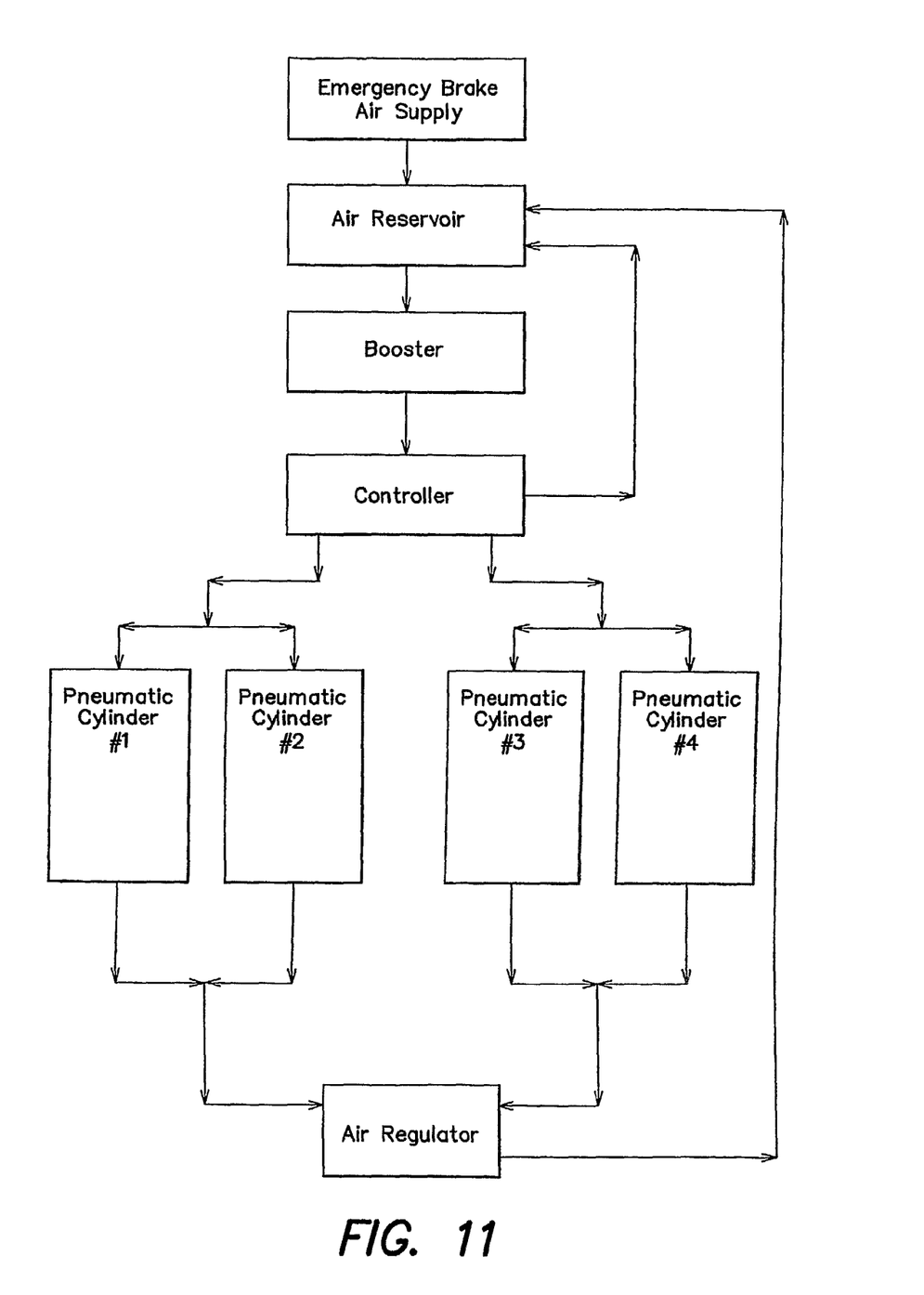
FIG. 11 is a diagrammatic flow chart, illustrating an example of a pneumatic system that can be used to power the pneumatics cylinders of a portion or all of the drive mechanism of the present lift gate apparatus.

For example, FIG. 5 shows an embodiment wherein the above-described pivot drive 38 is used to pivotally actuate the platform 14, and the lift drive 40 includes one or more pneumatic cylinders 74 operable to move the platform 14 between the bed-level position and a lower position. A first pneumatic cylinder 74 is disposed on one side of the platform 14, and a second pneumatic cylinder is disposed on the opposite side of the platform 14. The cylinders 74 are connected to one of the air supplies described above (e.g., the air supply for the emergency brake assembly of the truck body 12). A valve control system is used to control the movement of the pneumatic cylinders 74. Pneumatic valve control systems are well known and are therefore not discussed further herein. FIG. 11 diagrammatically illustrates, in the form of a flow chart, an example of a pneumatic system that can be used to power the cylinders 74. Air stored within a reservoir can be used to power the cylinders 74. The reservoir can also be used to receive air being displaced from the cylinders 74. During operation, the pneumatic motor 20 and respective gearbox 42 engage the pivot drive 38 to rotate the platform 14 between the stowed position and the deployed position. The pneumatic cylinders 74 are actuated to move the platform 14 between the bed-level position and a vertically lower position.

Referring to FIG. 6 in another drive mechanism 16 embodiment, a lift drive 40 arrangement like those described above (e.g., rod and threaded sleeve, chain and sprocket, etc.) is used in combination with a pivot drive 38 that utilizes one or more pneumatic cylinders 78 operable to pivot the platform 14 between the stowed and deployed positions. In the embodiment shown in FIG. 6, the pneumatic cylinder 78 is attached to bracketry 80 that vertically raises and lowers with the platform 14 via the lift drive 40. In the embodiment shown in FIG. 6, at least one pneumatic cylinder is disposed on a side of the platform 14 and connected to the link 18. Retracting the rod of the pneumatic cylinder 78 causes the platform 14 to rotate into the deployed position, and extending the rod causes the platform 14 to rotate into the stowed position. The above-described air sources power the pneumatic cylinder 78. A valve control system is used to control the movement of the pneumatic cylinder 78. Pneumatic valve control systems are well known and are therefore not discussed further herein. The air source may include a reservoir to supply air to and receive air from the cylinders 78.

Figure 7:
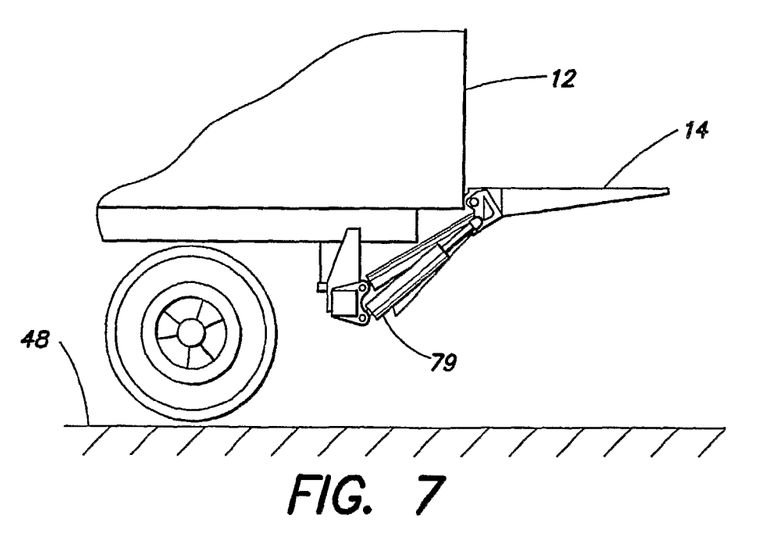
FIG. 7 is a diagrammatic side partial view of an embodiment of the present lift gate apparatus.

Referring to FIG. 7, in some embodiments one or more pneumatic cylinders are arranged to both pivot the platform and vertically lift the platform, thereby combining the functionality of the pivot drive and the lift drive. The above-described air sources can power the pneumatic cylinder(s) 79, and a valve control system is used to control the movement of the pneumatic cylinder 79.

Figure 8:
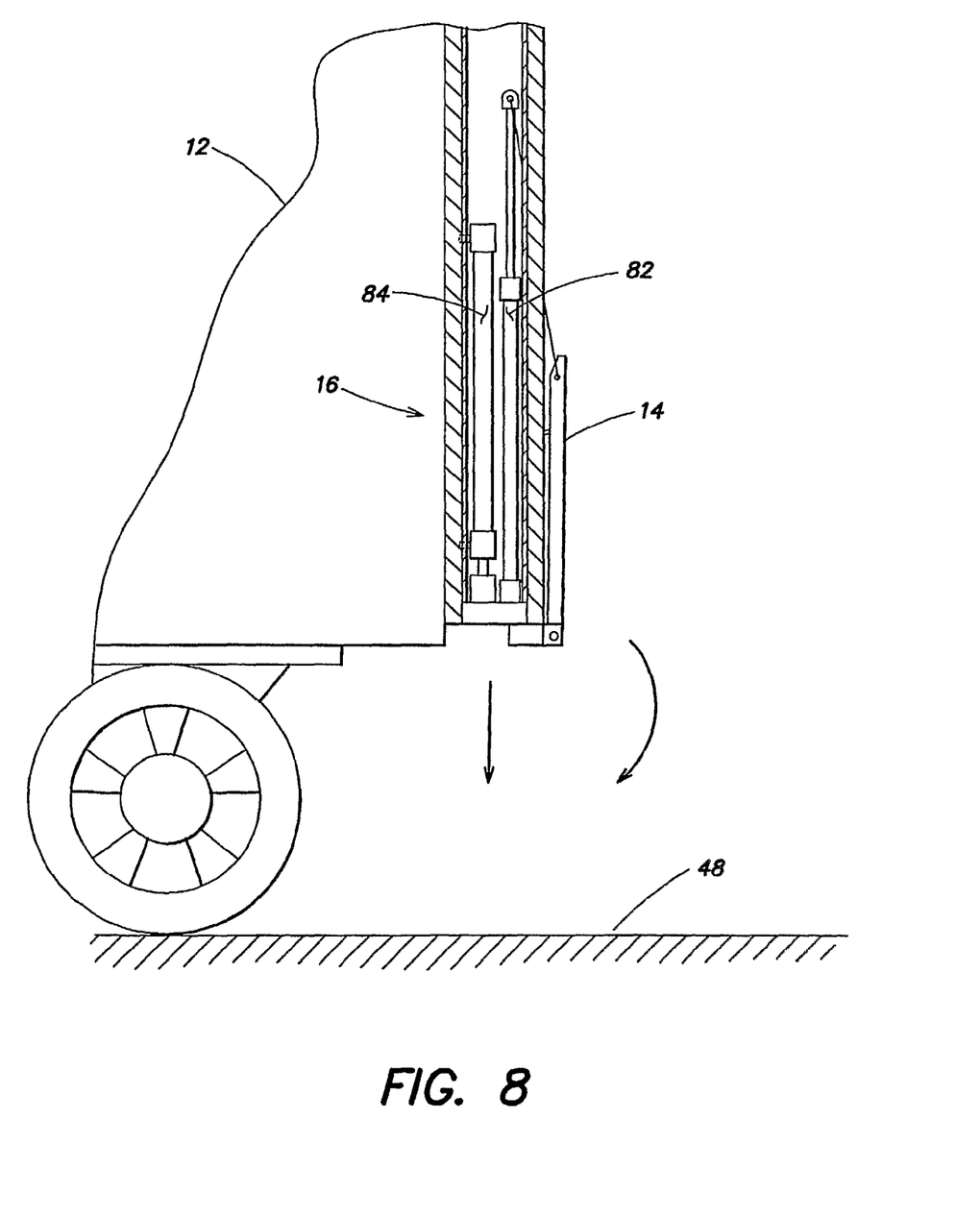
FIG. 8 is a diagrammatic side partial view of an embodiment of the present lift gate apparatus, showing the platform in the stowed, bed-level position.
Figure 9:
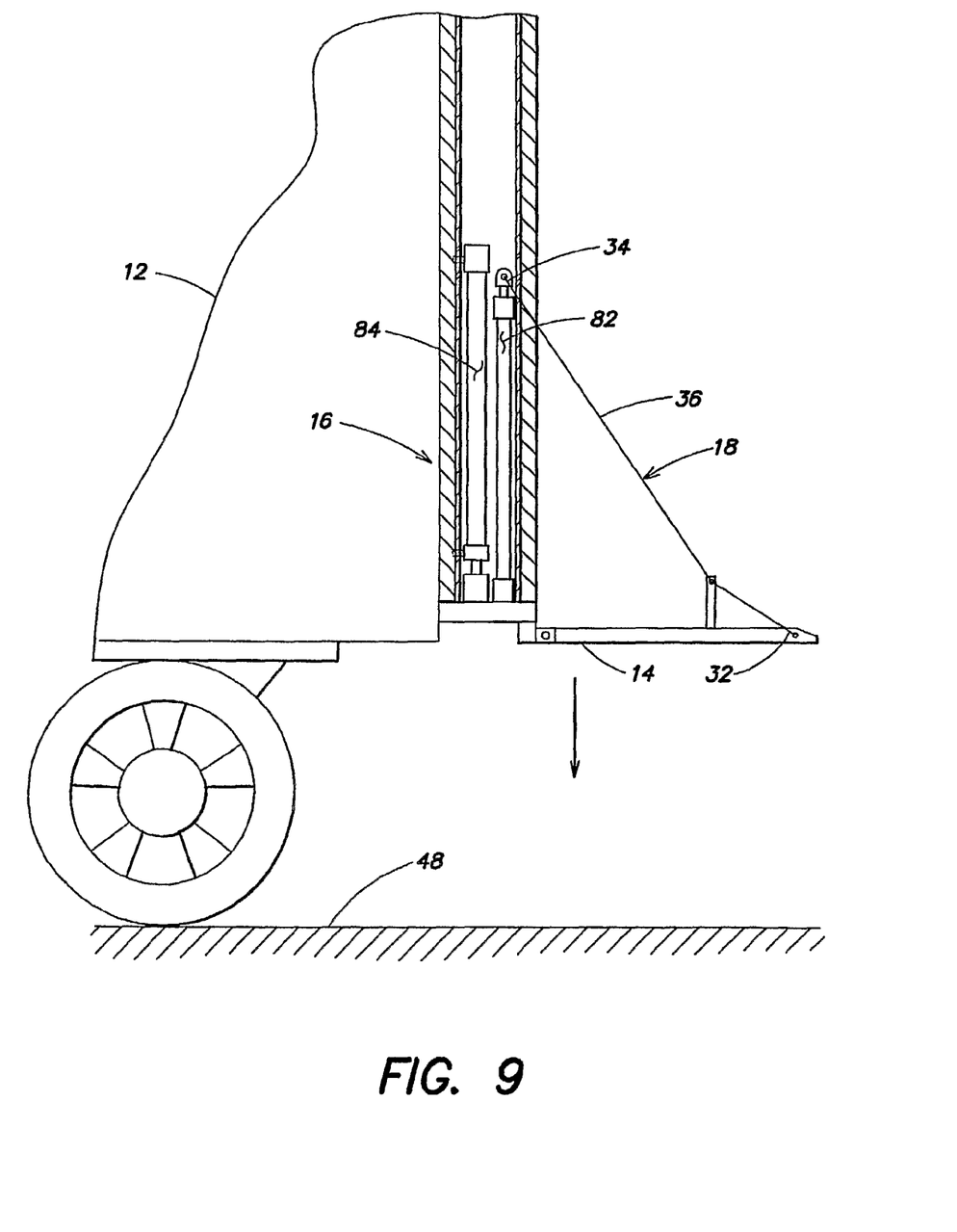
FIG. 9 is a diagrammatic side partial view of an embodiment of the present lift gate apparatus, showing the platform in the deployed, bed-level position.
Figure 10:
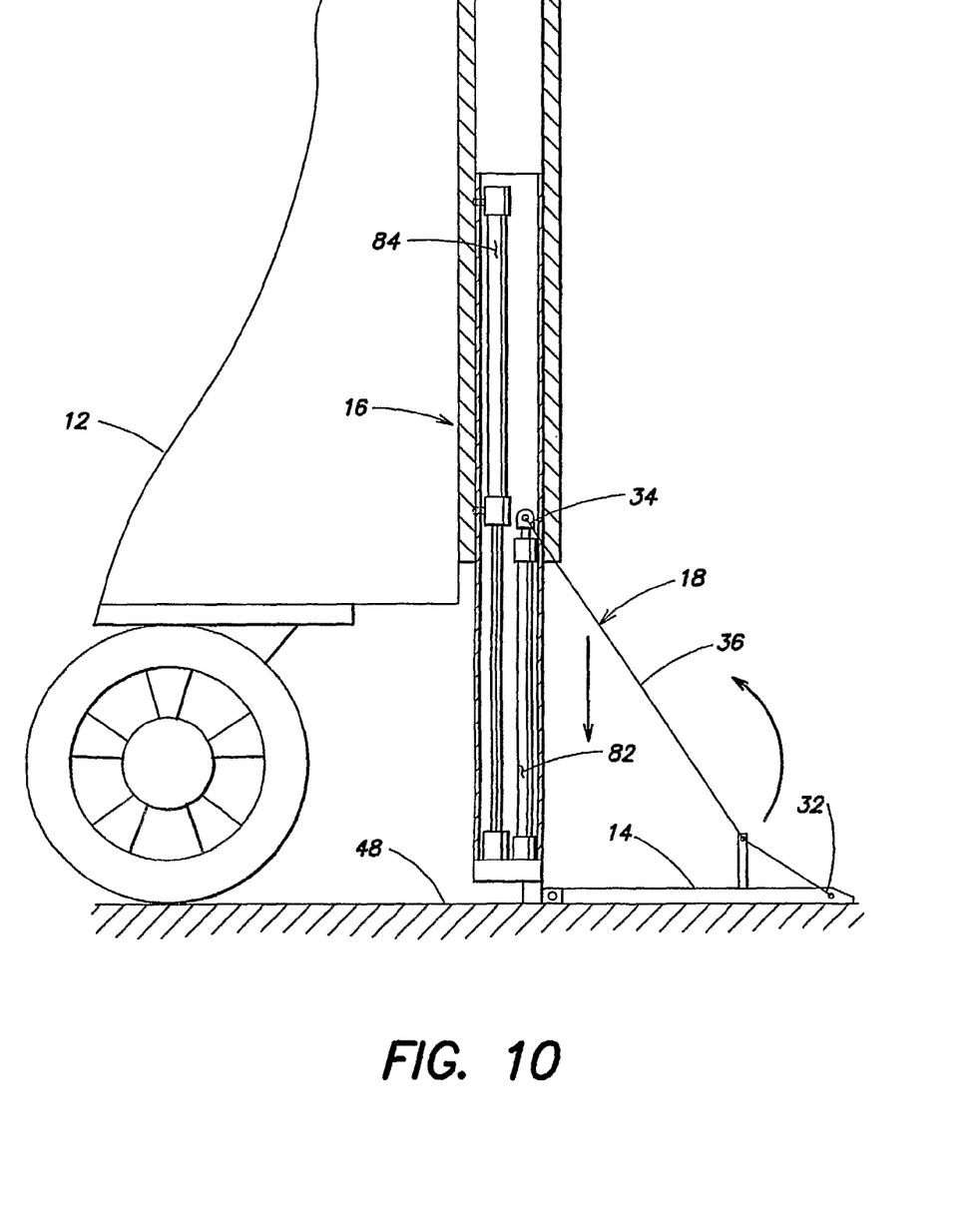
FIG. 10 is a diagrammatic side partial view of an embodiment of the present lift gate apparatus, showing the platform in the deployed, lower than bed-level position.

Referring to FIGS. 8-10, a further alternative embodiment of the drive mechanism 16 utilizes one or more pneumatic cylinders 82 to pivot the platform 14 between the stowed and deployed positions, and one or more pneumatic cylinders 84 to vertically move the platform 14 between the bed-level position and a position vertically lower than the bed 12 (e.g., the ground 48. In FIG. 8, the drive mechanism maintains the platform in a bed-level, stowed position). In FIG. 9, the platform is in a bed-level, deployed position. In FIG. 10, the platform is deployed in a lower than bed-level position.

FIG. 11 diagrammatically illustrates a pneumatic system that can be used to operate the pneumatic cylinders in the above described embodiments. The air supply for the pneumatic system is the emergency brake system of the truck 12. Air from the emergency brake system may be passed into a reservoir. From the reservoir, the air is passed into a pressure booster. The pressure booster is configured to increase the air pressure within the pneumatic system to a pressure that is adequate to power the pneumatic cylinders. Air subsequently travels into a controller (e.g., a valve type control system) operable to control movement of the pneumatic cylinders. Pneumatic control systems are well known and are therefore not discussed further herein.

Air passes from the controller to one or more pneumatic cylinders, depending upon the specifics of the drive mechanism. The high pressure air provides the force to operate the cylinders which subsequently operate the pivot drive 38 and/or the lift drive 40. The diagram shown in FIG. 11 illustrates a system that includes a pair of cylinders for the pivot drive 38 and a separately operable pair of cylinders for the lift drive 40. Air exiting the cylinders or the controller may be exhausted to the atmosphere, or returned to the reservoir. The diagram shown in FIG. 11 shows the exhaust air traveling back to the reservoir.

Although this invention has been shown and described with respect to the detailed embodiments thereof, it will be understood by those skilled in the art that various changes in form and detail thereof may be made without departing from the spirit and scope of the invention. For example, the drive mechanism 16 has been described above as having a pivot cross shaft 50 or a lift cross shaft 58. In alternative embodiments, either cross shaft 52, 58 could be eliminated by using a pair of motors 20, one on each side of the lift gate apparatus 10, synchronized to operate in tandem.

What is claimed is:

1. A lift gate apparatus for a truck or trailer having a pneumatic emergency brake system, comprising:
   a platform; and
   a drive mechanism operable to pivot the platform between a stowed position and a deployed position, and vertically move the platform between a bed-level position and a second position vertically lower than the bed-level position, wherein the drive mechanism includes a pivot drive powered by a pneumatic rotary motor;
   wherein the drive mechanism is pneumatically actuated and uses the pneumatic emergency brake system of the truck or trailer as a source of compressed air; and
   wherein the pneumatic rotary motor is connected to the pivot drive by a gear box.

2. The apparatus of claim 1, wherein the drive mechanism includes a lift drive powered by a pneumatic rotary motor.

3. The apparatus of claim 2, wherein the pneumatic rotary motor is connected to the lift drive by a gear box.

4. The apparatus of claim 1, wherein the drive mechanism includes a lift drive powered by a pneumatic cylinder.

* * * * *